(12) United States Patent
Carr et al.

(10) Patent No.: US 11,332,258 B2
(45) Date of Patent: May 17, 2022

(54) METHOD FOR ENHANCED FUEL CELL PROTECTION FROM ADJACENT DAMAGED COMPONENTS

(71) Applicant: Bell Helicopter Textron Inc., Fort Worth, TX (US)

(72) Inventors: Timothy Brian Carr, Fort Worth, TX (US); Jayson David Roe, Hurst, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 366 days.

(21) Appl. No.: 16/143,720

(22) Filed: Sep. 27, 2018

(65) Prior Publication Data

US 2020/0102086 A1 Apr. 2, 2020

(51) Int. Cl.
| | | |
|---|---|---|
| *B64D 37/32* | (2006.01) | |
| *B64C 1/06* | (2006.01) | |
| *B64C 27/04* | (2006.01) | |
| *B64C 1/00* | (2006.01) | |

(52) U.S. Cl.
CPC ............ *B64D 37/32* (2013.01); *B64C 1/062* (2013.01); *B64C 27/04* (2013.01); *B64C 2001/0072* (2013.01)

(58) Field of Classification Search
CPC .......... B64C 1/062; B64C 3/34; B64D 37/06; B64D 37/32; B60K 2015/03375; B60K 2015/03388; B60K 2015/03407
See application file for complete search history.

(56) References Cited

U.S. PATENT DOCUMENTS

| | | | | |
|---|---|---|---|---|
| 2,102,590 A | * | 12/1937 | Gray ..................... | B64D 37/06 244/135 B |
| 2,397,184 A | * | 3/1946 | Klose .................... | B64D 37/06 244/135 R |

(Continued)

FOREIGN PATENT DOCUMENTS

| | | |
|---|---|---|
| DE | 3049429 A1 | 7/1982 |
| EP | 3296214 A1 | 3/2018 |
| GB | 136635 | 1/1920 |

OTHER PUBLICATIONS

European Patent Office, European Search Report for EP Appl. No. 1821159.1 dated Jul. 15, 2019, 4 pp.

(Continued)

*Primary Examiner* — Joseph W Sanderson
(74) *Attorney, Agent, or Firm* — Edwin S. Flores; Daniel J. Chalker; Chalker Flores, LLP

(57) ABSTRACT

A method and device for protecting an adjacent rupturable component including positioning a sheet of puncture resistant, flexible material including one or more openings at or about the structure opening wherein the one or more openings accommodate the rupturable component; permanently or semi-permanently attaching the sheet to the structure at a first portion of an area of the sheet; and positioning the rupturable component through the one or more openings, such that one or more portions of the rupturable component near the one or more openings are protected by the sheet if the structure becomes frayed; wherein the sheet prevents damage to the rupturable component if the structure frays or fractures at or about the structure opening.

8 Claims, 13 Drawing Sheets

(56) References Cited

U.S. PATENT DOCUMENTS

| | | | | |
|---|---|---|---|---|
| 2,779,702 | A * | 1/1957 | Wilson | B64D 37/06 220/562 |
| 2,859,812 | A * | 11/1958 | Swanson | B64D 37/06 160/368.1 |
| 4,258,738 | A | 3/1981 | Redman et al. | |
| 4,907,733 | A * | 3/1990 | Pratt | F16B 5/02 228/122.1 |
| 5,451,015 | A | 9/1995 | Cronkhite et al. | |
| 5,893,534 | A * | 4/1999 | Watanabe | B64C 1/0685 244/119 |
| 7,195,285 | B2 * | 3/2007 | Rodousakis | B64D 37/06 220/23.4 |
| 7,198,224 | B2 * | 4/2007 | Townsend | B64C 27/006 244/17.11 |
| 7,984,877 | B2 * | 7/2011 | Hasmann | B64D 37/06 244/135 R |
| 8,167,245 | B1 * | 5/2012 | Koehler | B64C 3/34 244/123.1 |
| 8,894,014 | B2 * | 11/2014 | Yonezawa | B64D 45/02 244/135 R |
| 9,010,689 | B1 * | 4/2015 | Brook | B64D 37/32 244/135 R |
| 9,086,110 | B2 * | 7/2015 | Guimard | F16F 7/127 |
| 9,096,324 | B2 * | 8/2015 | Erickson | B64D 37/005 |
| 9,199,714 | B2 * | 12/2015 | Depeige | B64C 1/12 |
| 9,944,402 | B2 * | 4/2018 | Perez Diaz | B64C 3/187 |
| 10,293,952 | B2 * | 5/2019 | James | B64D 37/04 |
| 10,414,497 | B2 * | 9/2019 | Velez De Mendizabal Alonso | F41H 5/0457 |
| 10,710,699 | B2 * | 7/2020 | Plagianos | B64D 37/06 |
| 2005/0034781 | A1 | 2/2005 | Rodousakis et al. | |
| 2006/0243854 | A1 * | 11/2006 | Townsend | B64C 1/062 244/17.11 |
| 2009/0189021 | A1 * | 7/2009 | Hasmann | B64D 37/06 244/135 R |
| 2010/0308172 | A1 * | 12/2010 | Depeige | B64C 1/1461 244/132 |
| 2012/0012709 | A1 * | 1/2012 | Yonezawa | B64D 45/02 244/129.2 |
| 2013/0068878 | A1 * | 3/2013 | Liardon | B64D 37/32 244/17.23 |
| 2013/0333995 | A1 * | 12/2013 | Guimard | B64C 1/062 188/377 |
| 2014/0242896 | A1 * | 8/2014 | Plessner | F16L 25/026 454/71 |
| 2014/0284426 | A1 * | 9/2014 | Erickson | B64C 1/06 244/135 R |
| 2016/0355273 | A1 * | 12/2016 | Perez Diaz | B64C 3/34 |
| 2017/0057653 | A1 * | 3/2017 | Park | F41H 5/0485 |
| 2017/0066542 | A1 * | 3/2017 | James | B64D 37/06 |
| 2017/0121024 | A1 * | 5/2017 | Young | B64D 11/00152 |
| 2017/0225769 | A1 * | 8/2017 | Carlson | B32B 7/12 |
| 2018/0072423 | A1 * | 3/2018 | Velez De Mendizábal Alonso et al. | F01D 21/045 |
| 2018/0079480 | A1 * | 3/2018 | Plagianos | B64C 1/10 |
| 2020/0055611 | A1 * | 2/2020 | Walters | B64D 37/32 |
| 2020/0278026 | A1 * | 9/2020 | Peacock | B64C 3/18 |

OTHER PUBLICATIONS

European Patent Office, Communication pursuant to Article 94(3) EPC for EP Appl No. 18211159.1 dated Aug. 23, 2019, 10 pp.

* cited by examiner

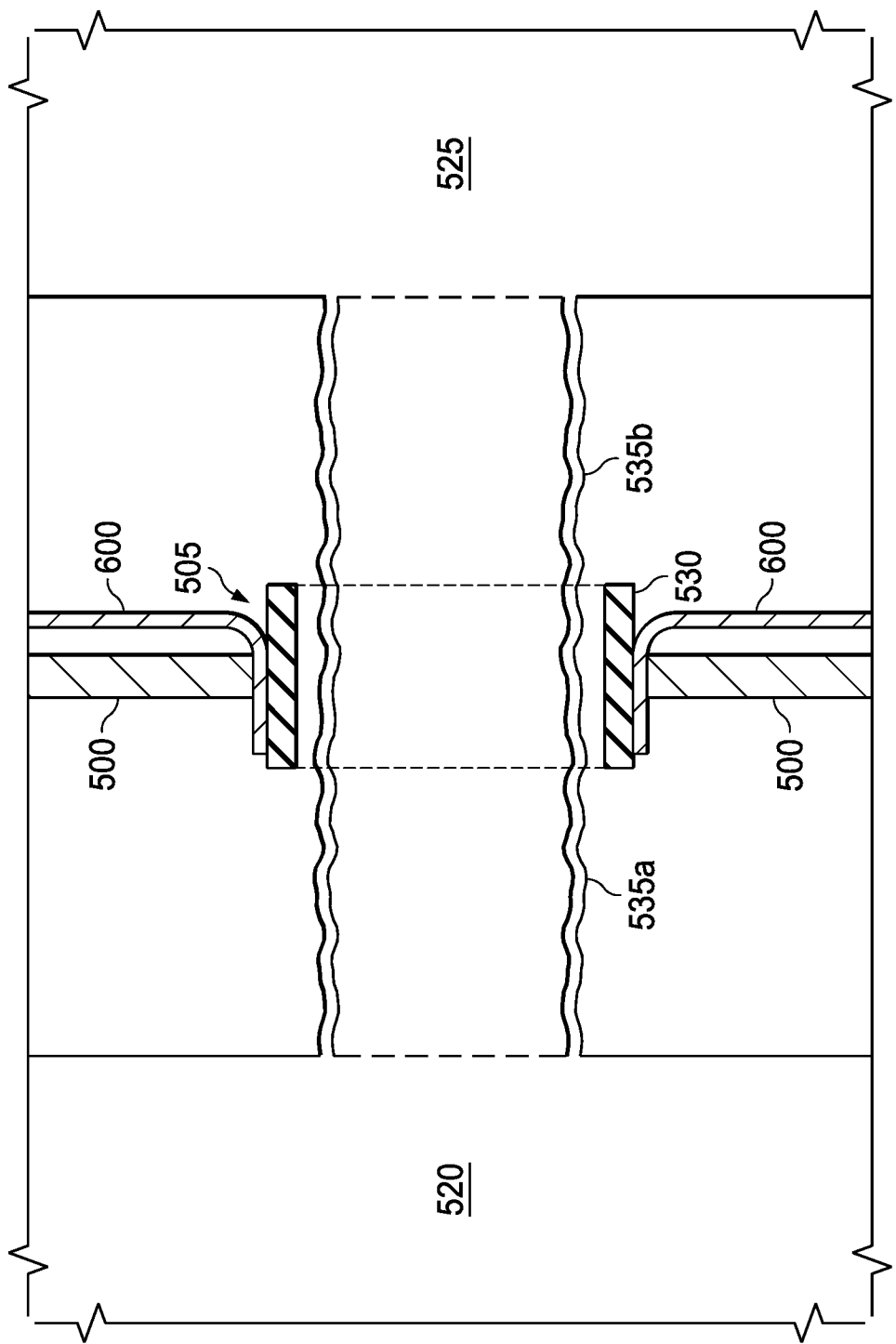

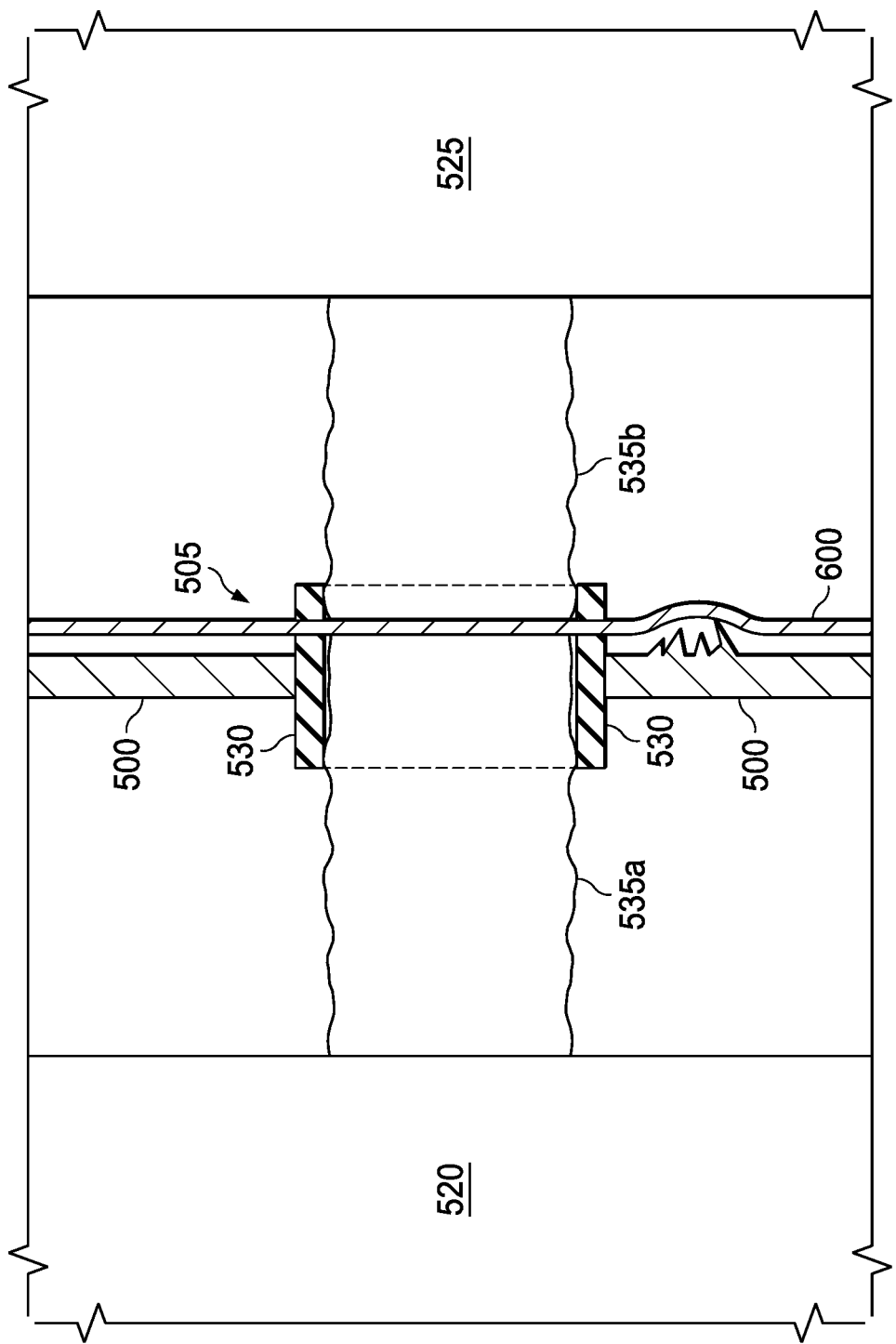

METHOD FOR ENHANCED FUEL CELL PROTECTION FROM ADJACENT DAMAGED COMPONENTS

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of protection of aircraft components, and more particularly, to protection of aircraft components from damage in crashes.

BACKGROUND OF THE INVENTION

Without limiting the scope of the invention, its background is described in connection with aircraft fuel systems.

Current U.S. regulations require that an aircraft fuel system develop no leaks when the aircraft is dropped from a height of 50 feet. In such a drop or in a crash, composite structures commonly incorporated into aircraft, such as composite structural components, may be expected to fracture. Rupturable fuel system components such as fuel cell interconnects adjacent to composite structural components must be protected against rupture by the sharp jagged or frayed edges and flying fragments of those structural components when they fracture in a test or in a crash.

One patent, U.S. Pat. No. 4,258,738, to Redman, et al., is said to disclose a crashworthy fuel system for aircraft or the like comprising a fuel tank and a valve for securement to the bottom of the tank. The valve comprises a generally L-shaped body having a first leg and a second leg extending generally at right angles to the first leg. A main flow passage extends through the entire length of the body. The first leg has a peripheral flange spaced from its outer end which is secured in face-to-face relation to the bottom of the tank with the outer end of the first leg extending up through a hole in the bottom of the tank into the interior of the tank for flow of fuel into the main flow passage and the second leg extending below the tank on the outside thereof for connection at its outer end to a fuel delivery line. The first leg has a circumferential area of weakness adjacent the flange between the flange and the second leg. A valve is provided in the main flow passage between this area of weakness and the inlet end of the main flow passage for sealing the main flow passage in the event of rupture of the valve body at the area of weakness, as during a crash of the aircraft. A valve is also provided toward the outlet end of the main flow passage for draining the latter.

Another patent, U.S. Pat. No. 5,451,015, to Cronkhite et al., is said to disclose a dual-purpose bulkhead structure that functions to support normal aircraft operational loads and to absorb energy in a controlled manner during a crash. An integral fuel tank includes a fuel compartment and a crashworthy flexible fuel cell. The fuel compartment includes two dual-purpose bulkheads and crushable foam disposed between the sides of the fuel cell and the bulkheads and sides of the fuel compartment. The foam limits fuel pressure loads on fuel compartment bulkheads and sides during a crash, thereby preventing their failure.

It is desirable to have a method or system to protect a rupturable component in the event of the fracture in a structural component of an aircraft such as a helicopter, a tiltrotor, or a tiltrotor.

SUMMARY OF THE INVENTION

In some embodiments of the disclosure, a method for protecting a rupturable component adjacent to a structure having one or more openings includes positioning a sheet of puncture resistant, flexible material comprising one or more openings at or about the opening wherein the one or more openings accommodate the rupturable component; permanently or semi-permanently attaching the sheet to the structure at a first portion of an area of the sheet and positioning the rupturable component through the one or more openings in the sheet and the structure, such that one or more portions of the rupturable component near the one or more openings are protected by the sheet if the structure becomes frayed or fractured; wherein the sheet prevents damage to the rupturable component if the structure frays or fractures at or about the structure opening. In one aspect, the structure is a component of an aircraft. In another aspect, the rupturable component is a fuel cell, a fuel cell interconnect, a drain line, a hydraulic line, a soft interconnect, or a feed line. In another aspect, the sheet comprises para-aramid, meta-aramid, nylon, polyethylene, DACRON®, or fibers. In another aspect, the method further includes providing a grommet, wherein the grommet is configured to be placed in the structure opening and to receive the rupturable component.

In some embodiments of the disclosure, a protective device for a rupturable component includes a sheet of puncture resistant, flexible material with one or more openings to accommodate a rupturable component being placed through the sheet; wherein the sheet has a portion of an area capable of being permanently attached or semi-permanently to a structure with a structure opening capable of receiving the rupturable component, such that the one or more openings and the structure are aligned to accommodate the rupturable component being placing through the one or more openings, and such that the sheet is capable of protecting the rupturable component if the structure becomes frayed. In one aspect, the structure is a component of an aircraft. In another aspect, the rupturable component is a fuel cell, a fuel cell interconnect, a drain line, a hydraulic line, a soft interconnect, or a feed line. In another aspect, the sheet comprises para-aramid, meta-aramid, nylon, polyethylene, DACRON®, or fibers. In another aspect, the one or more openings are adapted to receive a grommet, wherein the grommet is adapted to be placed in the structure opening and to receive the rupturable component.

In some embodiments of the disclosure, a kit for a protective device for a rupturable component includes a sheet of puncture resistant, flexible material with one or more openings to accommodate a rupturable component being placed through the sheet; wherein the sheet has a portion of an area capable of being permanently attached or semi-permanently to a structure with a structure opening capable of receiving the rupturable component, such that the one or more openings and the structure opening are aligned to accommodate the rupturable component being placed through the one or more openings and the structure opening, and such that the sheet is capable of protecting the rupturable component if the structure becomes frayed at or about the structure opening. In one aspect, the rupturable component is a fuel cell, a fuel cell interconnect, a drain line, a hydraulic line, a soft interconnect, or a feed line. In another aspect, the sheet comprises para-aramid, meta-aramid, nylon, polyethylene, polyethylene terephthalate, or fibers. In another aspect, the one or more openings are adapted to receive a grommet, wherein the grommet is adapted to be placed in the structure opening and to receive the rupturable component.

In some embodiments of the disclosure, a rotorcraft includes a fuselage; one or more engines couples to the fuselage; one or more structures coupled to the fuselage; and a sheet of puncture resistant, flexible material with one or more openings to accommodate a rupturable component being placed through the sheet; wherein the sheet has a portion of an area capable of being permanently attached or semi-permanently to a structure with a structure opening capable of receiving the rupturable component, such that the one or more openings and the structure opening are aligned to accommodate the rupturable component being placed through the one or more openings and the structure opening, such that the sheet is capable of protecting the rupturable component if the structure becomes frayed at or about the structure opening. In one aspect, the rupturable component is a fuel cell, a fuel cell interconnect, a drain line, a hydraulic line, a soft interconnect, or a feed line. In another aspect, the sheet comprises para-aramid, meta-aramid, nylon, polyethylene, polyethylene terephthalate, or fibers. In another aspect, the one or more openings are adapted to receive a grommet, wherein the grommet is adapted to be placed in the structure opening and to receive the rupturable component.

BRIEF DESCRIPTION OF THE DRAWINGS

For a more complete understanding of the features and advantages of the present invention, reference is now made to the detailed description of the invention along with the accompanying figures and in which:

FIG. 6C shows a cross-section of two fuel cells connected through the exemplary structure opening with the sheet of flexible, puncture resistant material in place.

FIG. 6D shows a cross-section of two fuel cells connected through the exemplary structure opening with the structure having a sharp damaged area and with the sheet of flexible, puncture resistant material protecting a rupturable component.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
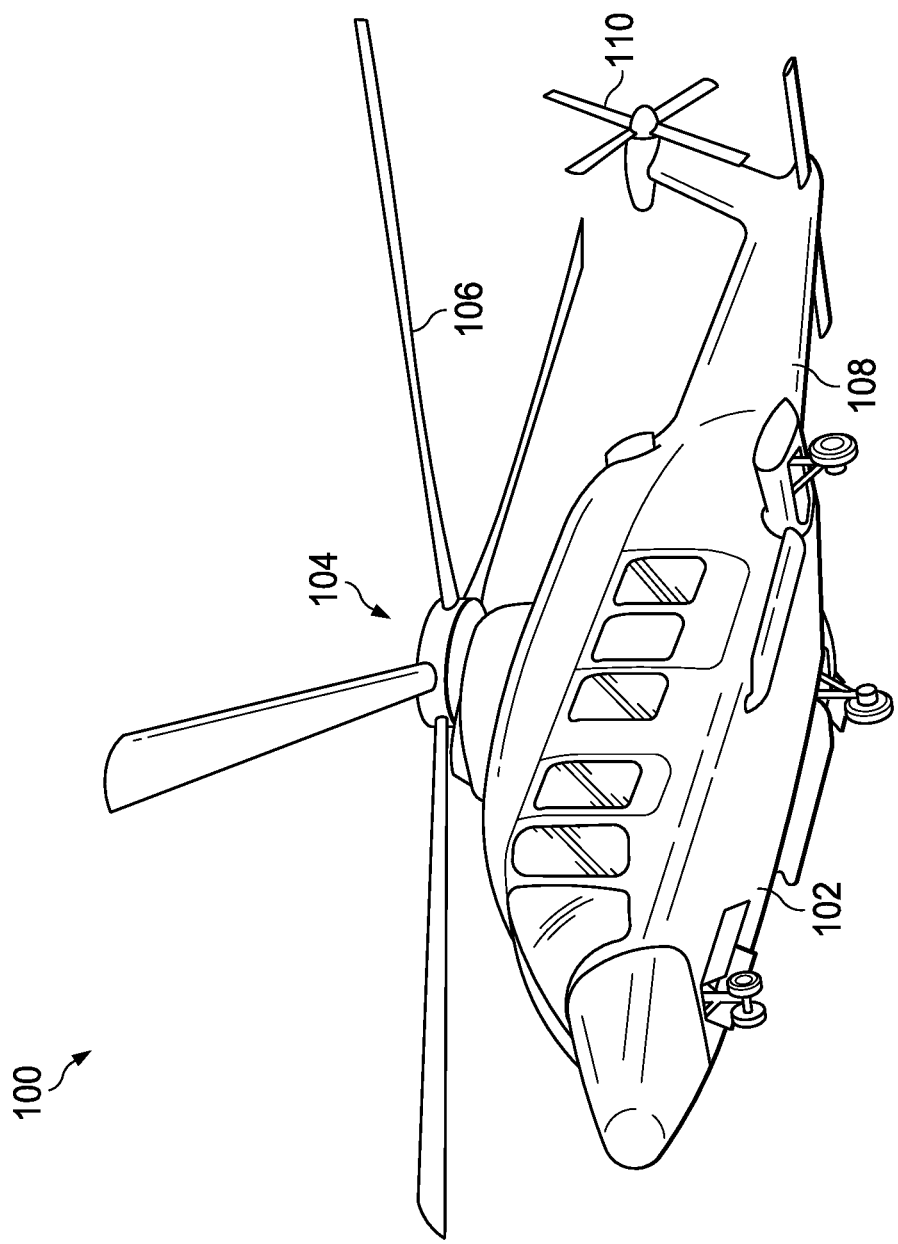
FIG. 1 shows a side view of a helicopter according to a particular embodiment of the present invention.

FIG. 1 shows an aircraft 100 in accordance with one embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
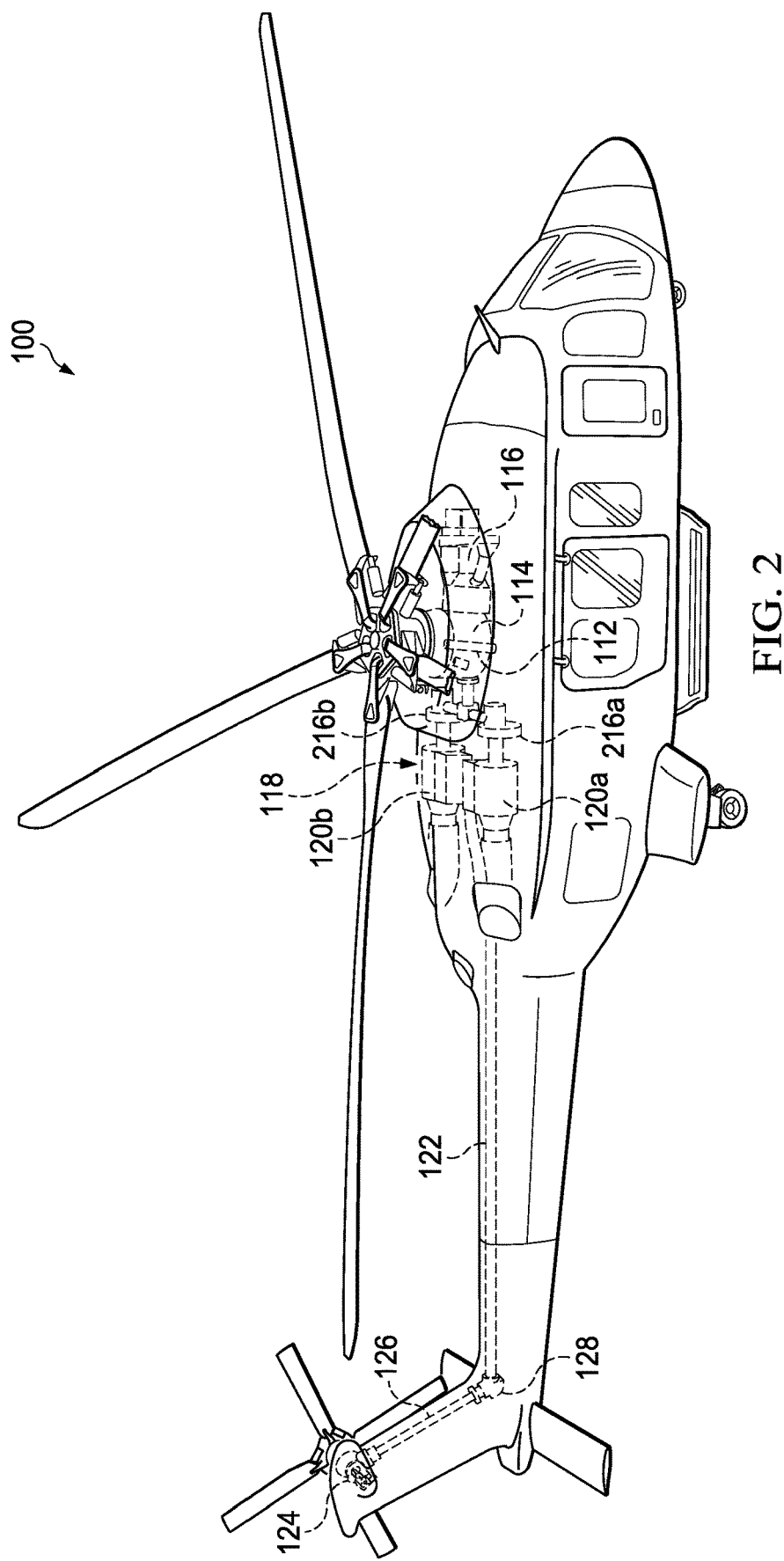
FIG. 2 shows a partial cross-section, perspective view of a helicopter according to an embodiment of the present invention.

For example, FIG. 2 shows a partial cross-section perspective view of aircraft 100 that includes additional detail of the present invention. Aircraft 100 further includes a rotor mast 112, which is connected to the main rotor gearbox (MRGB) 114. The MRGB 114 is connected to one or more accessory gear boxes 116 and one or more reduction gearboxes (RGB) 216a, 216b, hydraulic pump(s) and generator(s). Each RGB 216a, 216b is connected to one or more engines 120a, 120b, which are within an engine compartment 118. A tail rotor drive shaft 122 transmits mechanical rotation to the tail rotor gearbox 124, which is connected via tail rotor drive shaft 126 and intermediate gear box 128.

Figure 3:
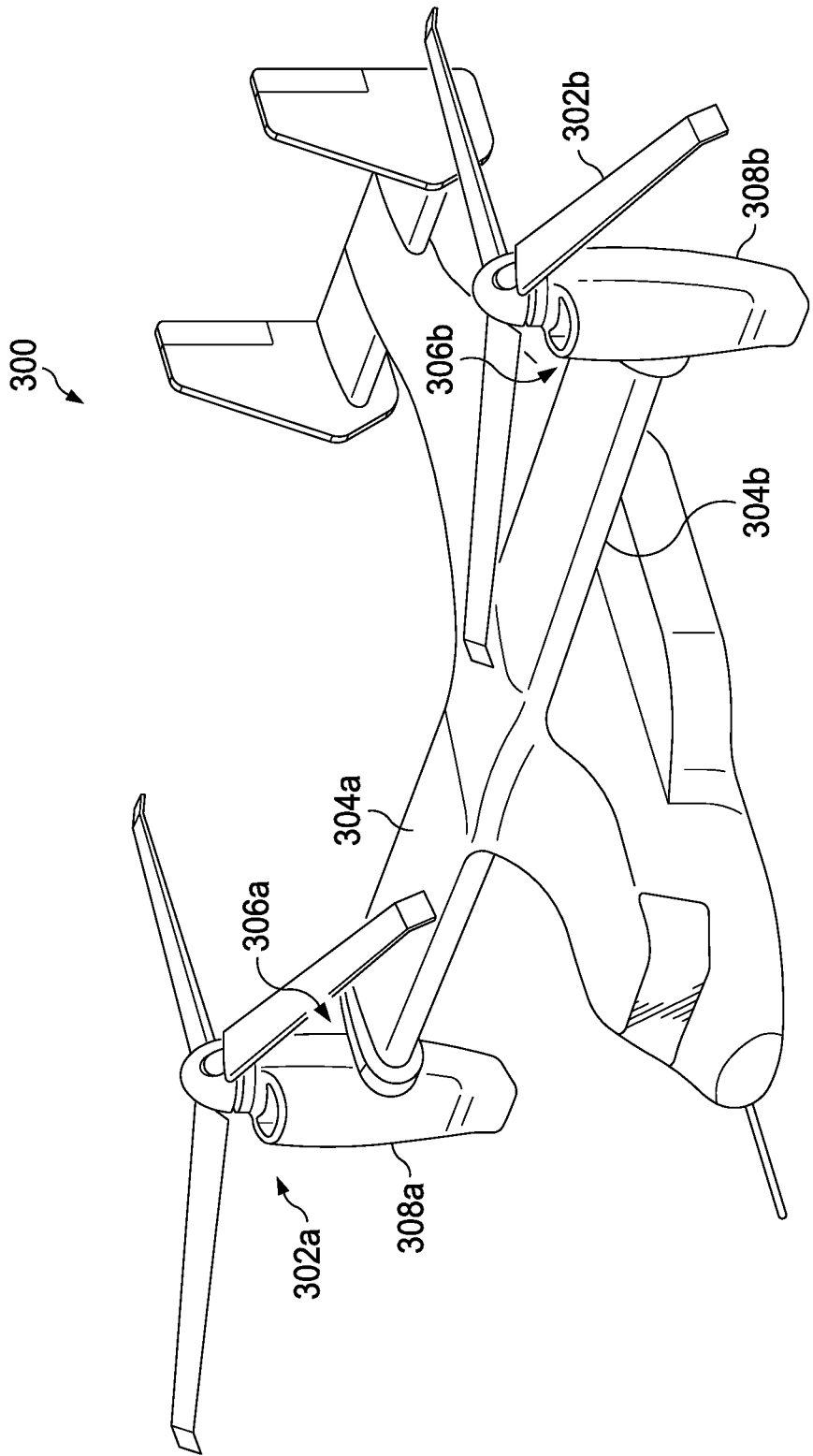
FIG. 3 shows a perspective view of a tiltrotor aircraft that can use the present invention.

FIG. 3 shows a tiltrotor aircraft 300 that utilizes the system in accordance with the present application. Tiltrotor aircraft 300 includes tilt rotor assemblies 302a and 302b that are carried by wings 304a and 304b, and are disposed at end portions 306a and 306b of wings 304a and 304b, respectively. Tilt rotor assemblies 302a and 302b include nacelles 308a and 308b, which carry the engines and transmissions of tiltrotor aircraft 300. Tilt rotor assemblies 302a and 302b move or rotate relative to wing members 304a and 304b between a helicopter or hover mode in which tilt rotor assemblies 302a and 302b are tilted upward, such that tiltrotor aircraft 300 flies like a conventional helicopter; and an airplane or cruise mode in which tilt rotor assemblies 302a and 302b are tilted forward, such that tiltrotor aircraft 300 flies like a conventional propeller driven aircraft.

Figure 4:
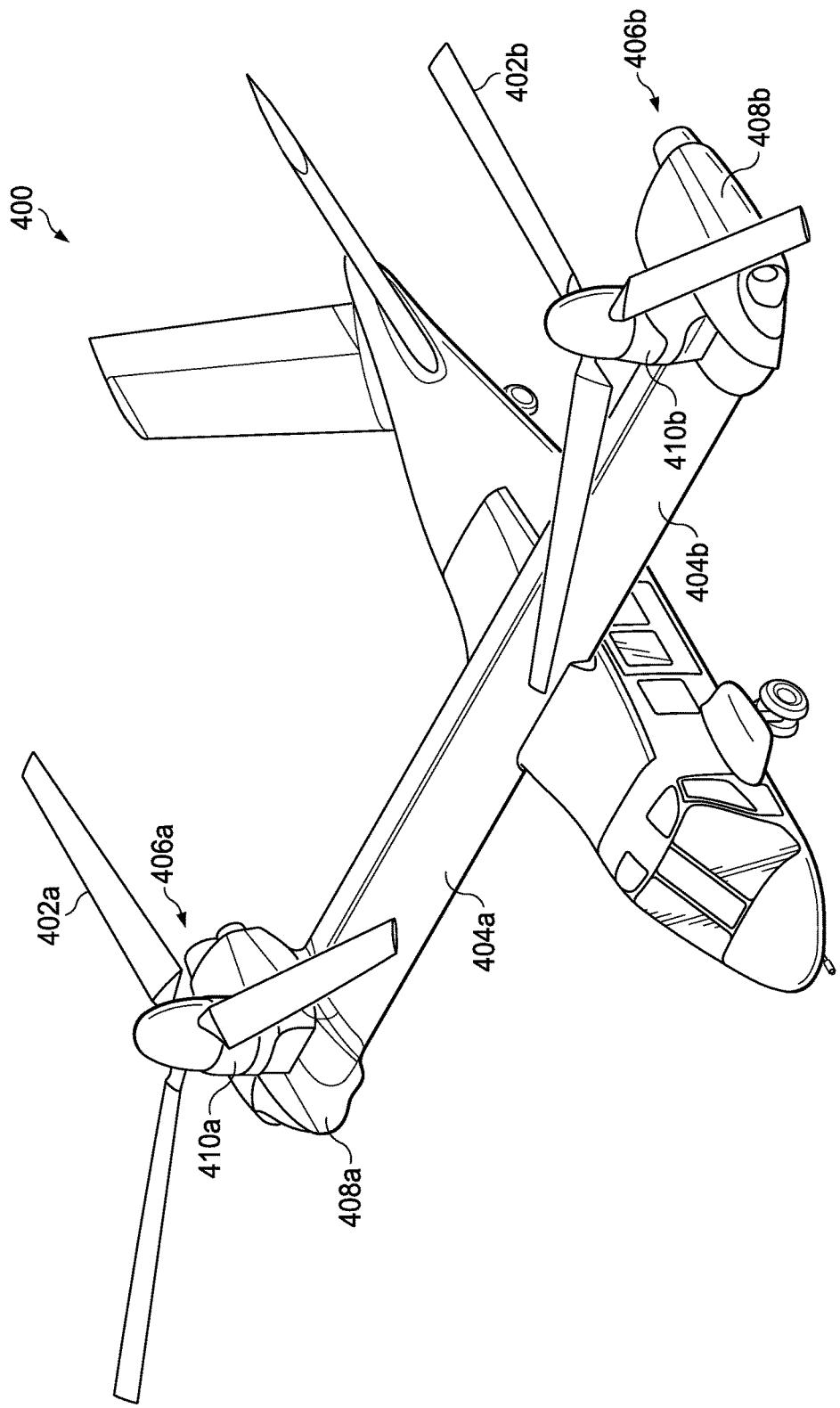
FIG. 4 shows a perspective view of another tiltrotor aircraft that can also use the present invention.

FIG. 4 shows another tiltrotor aircraft 400 that utilizes the system in accordance with the present application. Tiltrotor aircraft 400 includes tilt rotor assemblies 402a and 402b that are carried by wings 404a and 404b, and are disposed at end portions 406a and 406b of wings 404a and 404b, respectively. Tilt rotor assemblies 402a and 402b include nacelles 408a and 408b, which include the engines and transmissions of tiltrotor aircraft 400. In this embodiment, the engines are fixed to the wing and do not rotate, rather, only the pylons 410a and 410b with the tilt rotor assemblies 402a and 402b rotate. Tilt rotor assemblies 402a and 402b move and rotate relative to wing members 404a and 404b and the nacelles 408a and 408b. The tilt rotor assemblies 402a and 402b do not more relative to the wing members 404a and 404b. Instead, during the transition between a helicopter or hover mode only the pylons 410a and 410b with the tilt rotor assemblies 402a and 402b rotate to redirect the thrust from the tilt rotor assemblies 402a and 402b. The tiltrotor aircraft 400 is still able to fly like a conventional helicopter; and an airplane or cruise mode in which one of the rotors are tilted forward, such that tiltrotor aircraft 400 flies like a conventional propeller driven aircraft.

Figure 5A:
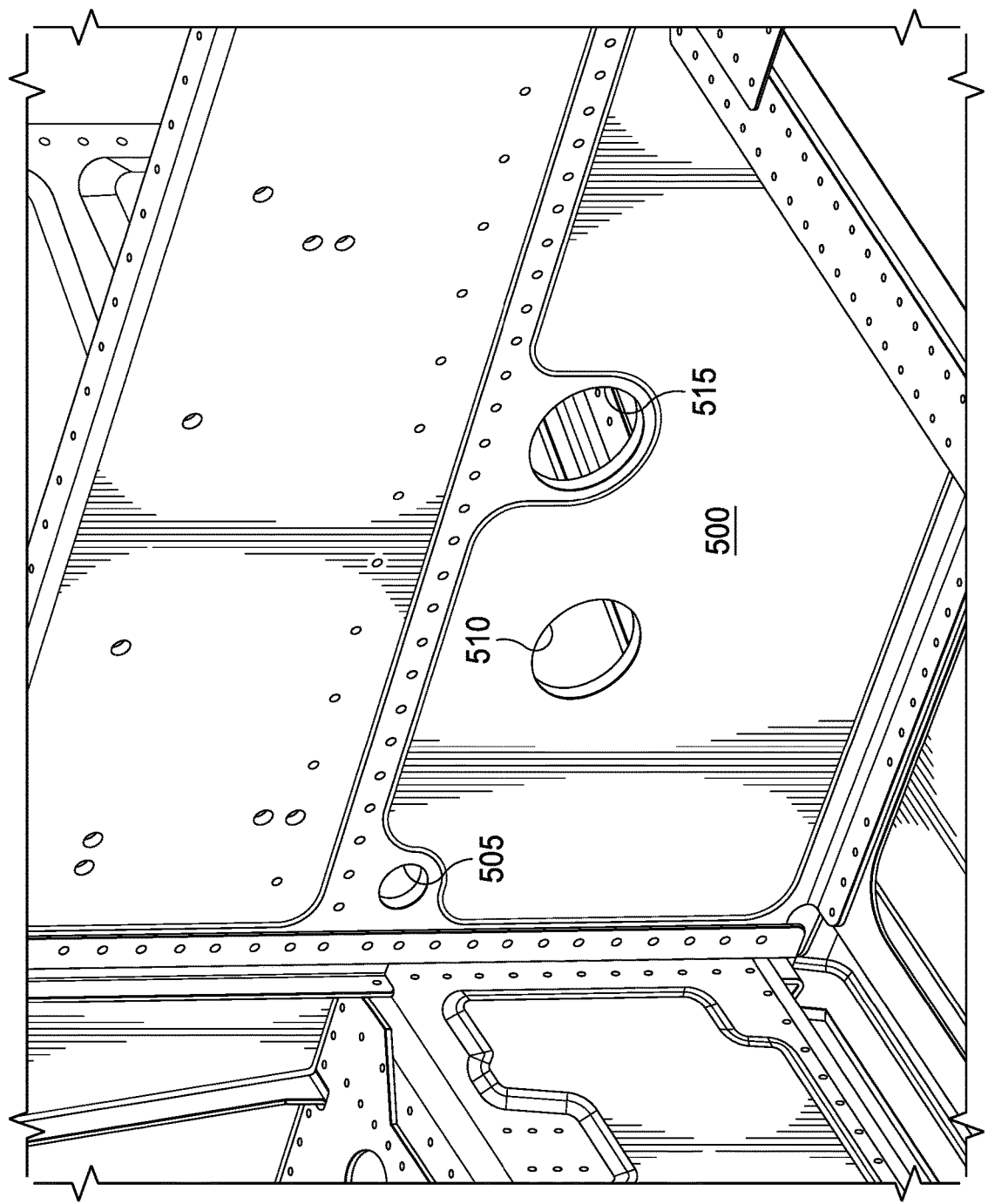
FIG. 5A illustrates an exemplary structural component.

FIG. 5A illustrates an exemplary structural component 500. Structural component 500 includes three structure openings 505, 510, and 515 through which, e.g., fuel cells may be connected. Embodiments of the present invention may be used in conjunction with these structure openings 505, 510, and 515 and similar openings for the passage of any fluids across structural component 500.

Figure 5B:
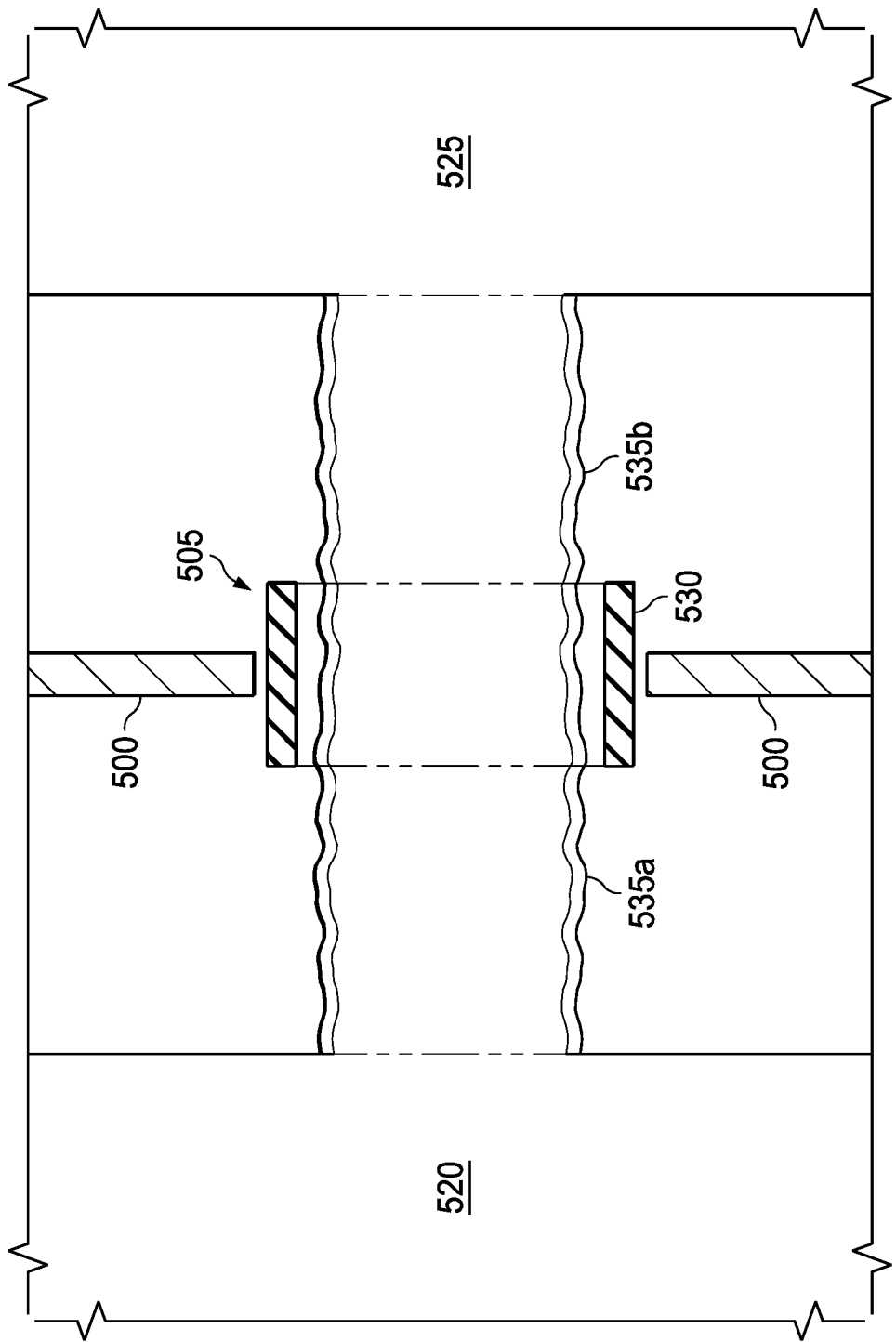
FIG. 5B depicts a cross-section of two fuel cells connected through an exemplary structure opening.

FIG. 5B depicts a cross-section of two fuel cells connected through exemplary structure opening 505. One fuel cell 520 is connected to another fuel cell 525 through structural opening 505, with a grommet 530 that protects the flexible fuel cell interconnects 535a, 535b from a guillotine-type cut across the flexible fuel cell interconnects 535a, 535b. The fuel cell interconnects 535a, 535b, connect the fuel cells 520 and 525. Fuel flows as required from one fuel cell 520, 525 to the other through the fuel cell interconnects 535a, 535b, and are surrounded by the grommet 530. The grommet 530 can be connected to the structural component 550, the flexible fuel cell interconnects 535a, 535b, or be free-floating between the two the flexible fuel cell interconnects 535a, 535b. In a test or a crash, the fuel cell interconnects 535a, 535b, must be protected from being ruptured by the sharp jagged or frayed edges of a structural component that has fractured, or from the sharp flying fragments from the fracture which is of particular concern when using composite materials in the structural components 500. Generally, rupturable components that are adjacent to composite structural components, of which fuel cell interconnects 535a, 535b, are an example, must be protected from such jagged or frayed edges and flying fragments in the event of a structural component failure.

Figure 5C:
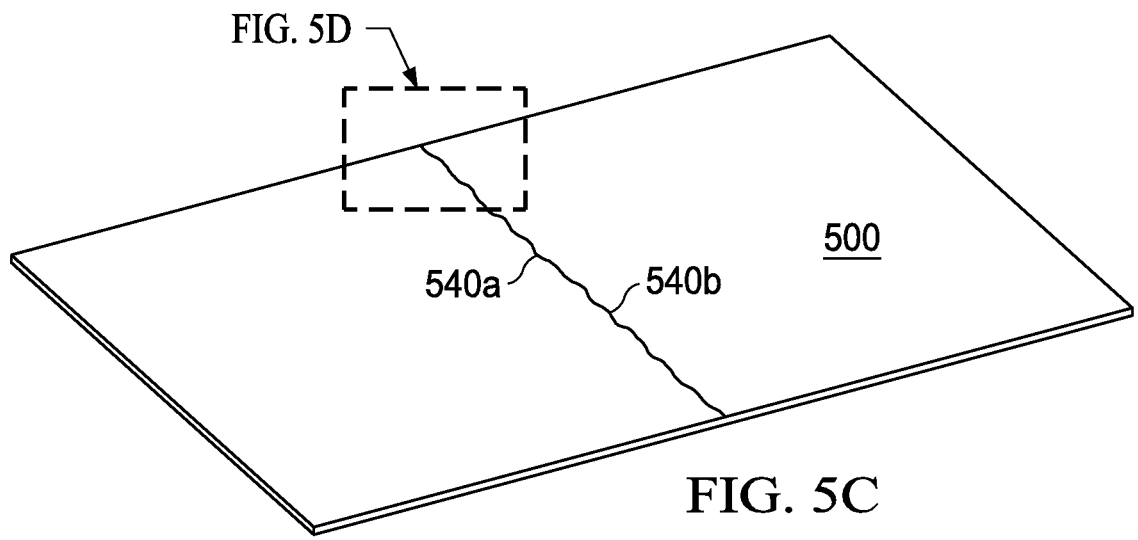
FIG. 5C depicts an exemplary fractured structural component with jagged or frayed edges.
Figure 5D:
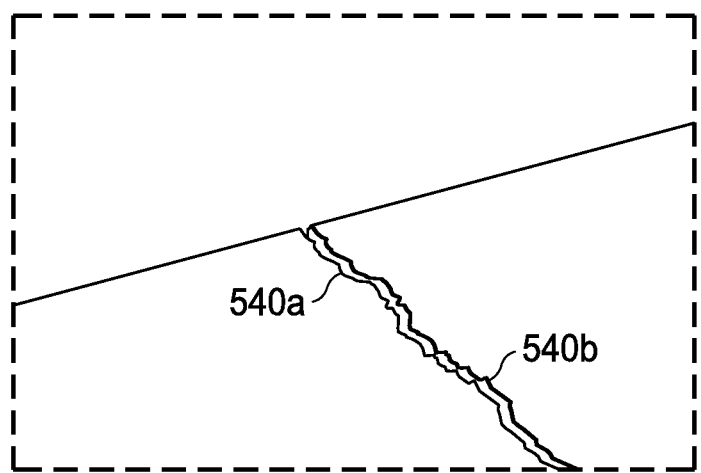
FIG. 5D shows a close-up view of the jagged or frayed edges of the fractured structural component of FIG. 5C.

FIG. 5C depicts an exemplary fractured structural component 500, with jagged or frayed edges 540a, 540b. FIG. 5D shows a closer view of the jagged or frayed edges 540a, 540b. FIG. 5D shows a close-up view of the jagged or frayed edges 540a, 540b of the fractured structural component of FIG. 5C.

Figure 6A:
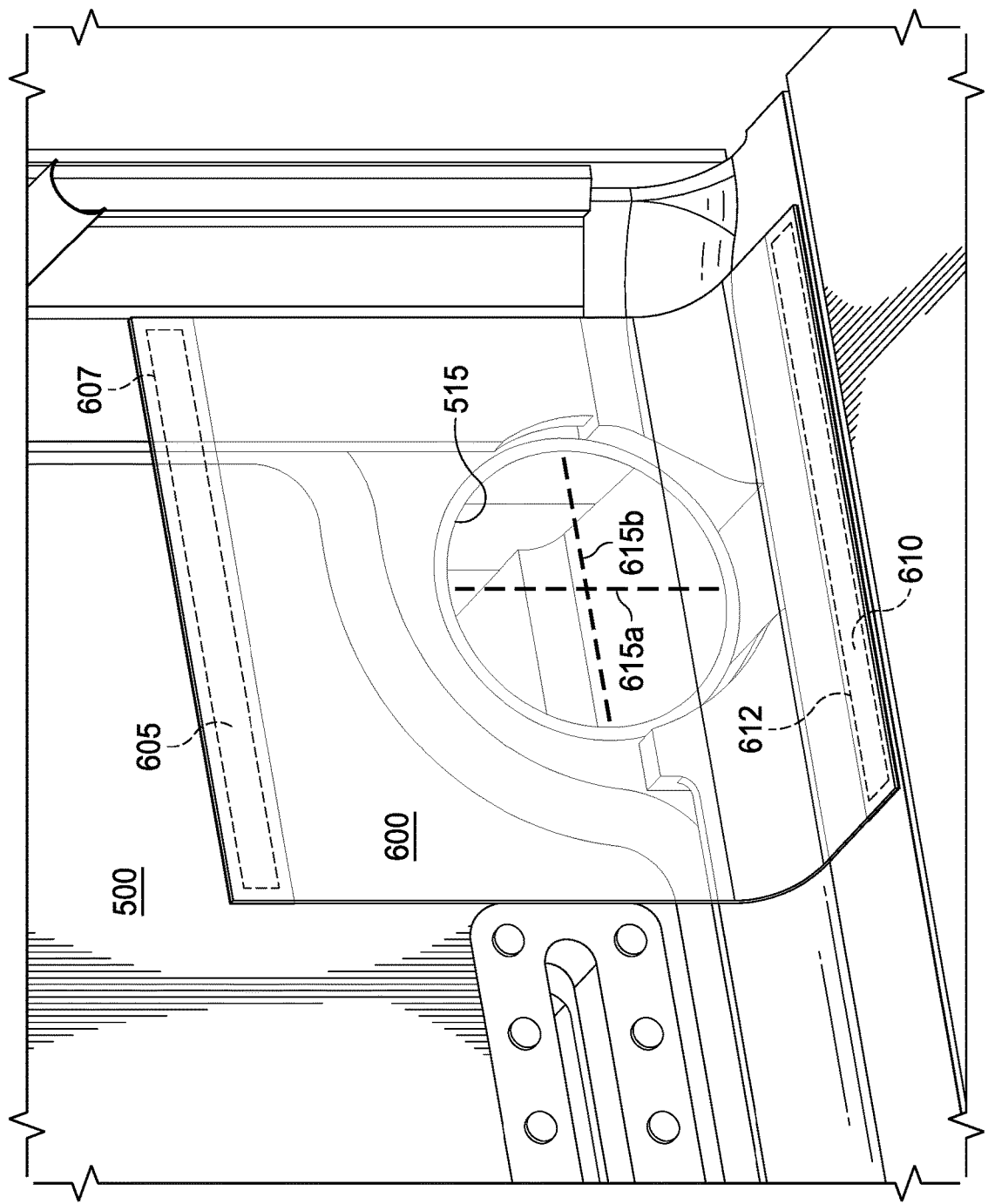
FIG. 6A illustrates an embodiment of the present invention, a sheet of flexible, puncture resistant material.

FIG. 6A illustrates an embodiment of the present invention in which a sheet 600 of flexible, puncture resistant material is shown positioned near structure opening 515 (which is similar to structure openings 505 and 510). Sheet 600 may comprise a commercially available material such as KEVLAR® synthetic fiber, or more generally, the sheet may comprise, for example, para-aramid, meta-aramid, nylon, polyethylene, or polyethylene terephthalate (e.g., DACRON®). Sheet 600 may be permanently attached to structural component 500 at, for instance, the sheet area 605 or semi-permanently attached to structural component 500 at, for instance, the sheet area 610. Permanent attachment may include, for example, bonding with bonding material 607, or semi-permanent attachment may include attachment with a semi-permanent attachment material 612, for example, hook-and-loop fasteners. The areas of semi-permanent attachment, or no attachment at all, allow for freedom of movement of the sheet 600. In FIG. 6A both bonding material 607 and semi-permanent attachment material 612 are shown. Openings 615a and 615b are exemplary slits cut into the sheet 600 and adapted to allow placement of a rupturable component such as fuel cell interconnects 535a and/or 535b (not shown) through the grommet (not shown) positioned within structure opening 515. One, two, three, or more slits may be cut into the sheet 600 and adapted for the purpose described. The one or more openings 615a and 615b allow a grommet within which a rupturable component is placed to be inserted through the openings 615a and 615b and the structure opening 515 from the side of the structural component 500 on which the sheet 600 is attached, such that portions of the sheet 600 are deflected into the structure opening 515 to form a flexible protective barrier around the grommet and the rupturable component on the sheet side of the structure opening 515. In a crash, fuel cell 520 or fuel cell 525 may move, pulling the fuel cell interconnects 535a, 535b to one side of the structure opening 515, in which case the deflected portions of the sheet 600 will protect the fuel cell interconnects 535a, 535b even if the grommet is pulled out of position. Openings other than slits may be used, such as circular or oval openings or combinations of various opening types such as circular openings and slits, such that one or more deflected sheet portions protect the grommet and rupturable components from damage by fractured structure components. The rupturable component may be, for example, a fuel cell, a fuel cell interconnect, a drain line, a hydraulic line, a soft interconnect, or a feed line.

Figure 6B:
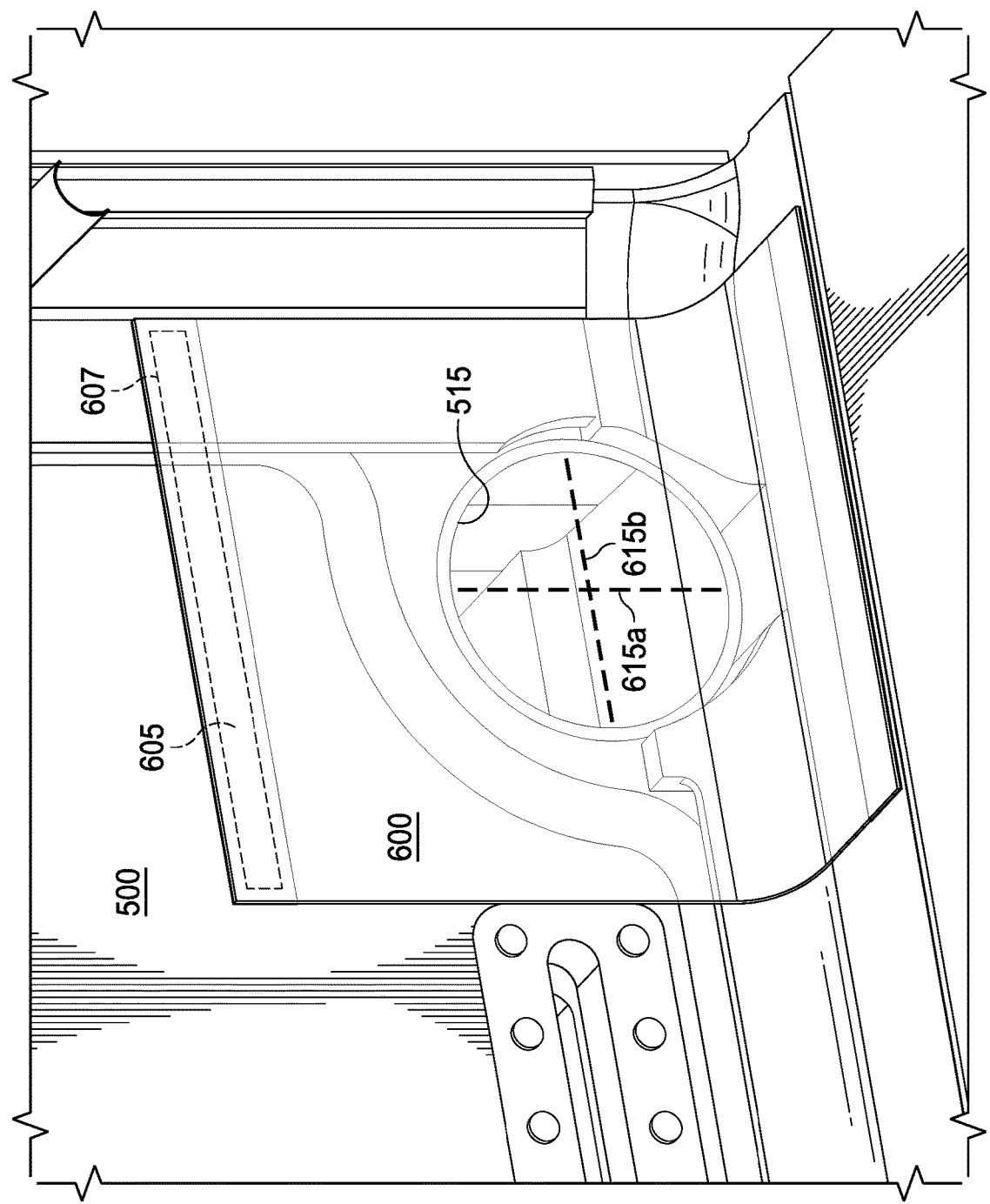
FIG. 6B illustrates another embodiment of the present invention, a sheet of flexible, puncture resistant material.

FIG. 6B an embodiment of the present invention in which a sheet 600 of flexible, puncture resistant material is shown positioned near structure opening 515 and permanently attached to structural component 500 at the sheet area 605. In this embodiment, the bottom portion of the sheet 600 is not semi-permanently attached to structural component 500 anywhere, making possible more freedom of movement.

FIG. 6C shows a cross-section of two fuel cells 520, 525 connected through exemplary structure opening 505 with sheet 600 in place, and with an undamaged structural component 500. In the event of a fracture in the structural component 500, the jagged or frayed edge of the fractured structural component 500 would intersect with the deflected sheet portions instead of the grommet 530 and the rupturable component, or flying fragments from the fractured structural component 500 would hit the deflected portions of the sheet 600 instead of the grommet 530 or the rupturable component.

FIG. 6D shows a cross-section of two fuel cells 520, 525 connected through exemplary structure opening 505 with sheet 600 in place, and with a damaged structural component 500. The jagged or frayed edge of the fractured structural component 500 intersects with the deflected sheet portions instead of the grommet 530 and the rupturable component, or flying fragments from the fractured structural component 500 hit the deflected portions of the sheet 600 instead of the grommet 530 or the rupturable component.

Sheet 600 can protect the grommet 530 or a rupturable component such as fuel cell 520 or fuel cell 525 in the event of a crack at the edge of penetration, e.g., a crack to the edge of structure opening 505 or a fracture in, e.g., structural component 500, that results in part of the fractured component coming out of plane. As describe elsewhere herein, the sheet 600 can be attached or not attached such that it can move with the structure opening 505 or with a fracture to give protection.

Figure 6E:
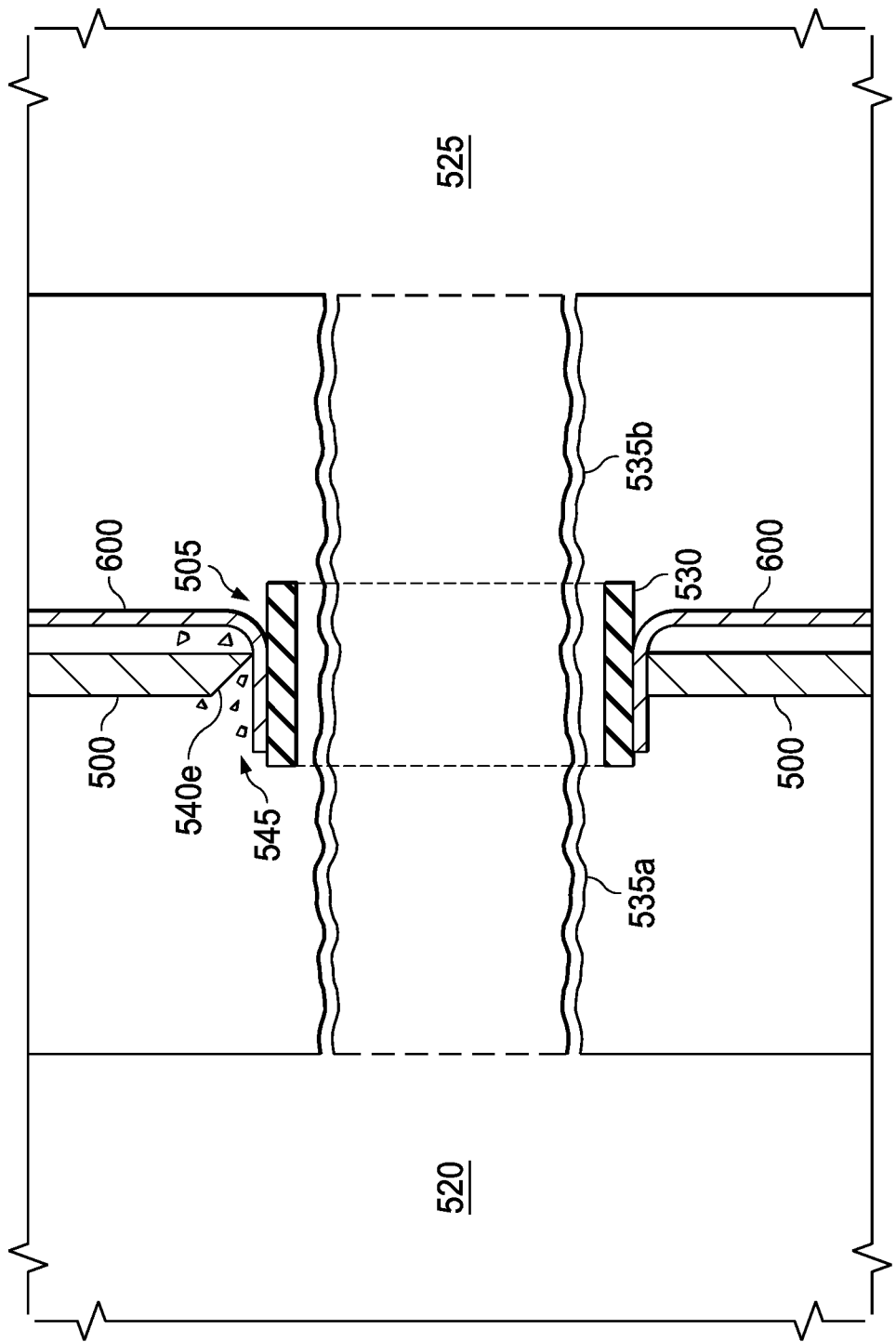
FIG. 6E shows a cross-section of two fuel cells connected through the exemplary structure opening with the structure fractured and with the sheet of flexible, puncture resistant material protecting a rupturable component.

FIG. 6E shows a cross-section of two fuel cells 520, 525 connected through structure opening 505 after a fracture of structural component 500 and illustrates the protection of the fuel cell interconnects 535a, 535b by sheet 600. In the scenario depicted, the structural component 500 has fractured and the grommet 530 has been pulled to one side of the structural opening 505. The jagged or frayed edge 540e (similar to jagged or frayed edge 540a, 540b in FIGS. 5C and 5D) and the set of sharp fragments 545 present a threat of damage to the fuel cell interconnect 535a and/or 535b. The sheet 600, positioned between the jagged or frayed edge 540e and the set of sharp fragments 545 on one side and the fuel cell interconnect 535b on the other, prevents that damage.

Sheet 600 may be included in a kit for upgrading an aircraft.

While the embodiments discussed and/or illustrated in FIGS. 6A-6E are discussed and/or illustrated with a grommet 530 that protects the fuel cell interconnects 535a and/or 535b, the present invention protects a rupturable component with or without the grommet 530 or an equivalent item.

Figure 7:
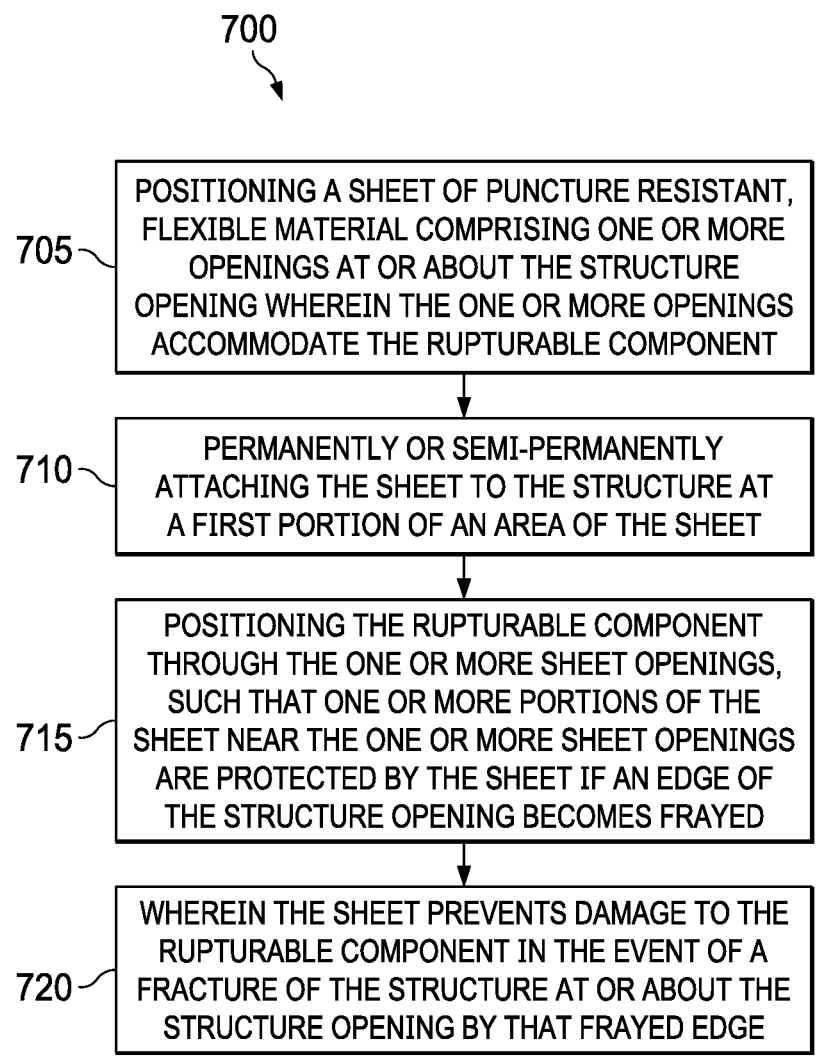
FIG. 7 illustrates a method embodiment of the present invention.

FIG. 7 illustrates a method embodiment of the present invention. Method 700 for protecting a rupturable component includes positioning a sheet of puncture resistant, flexible material comprising one or more openings at or about the structure opening wherein the one or more openings accommodate the rupturable component in block 705. Block 710 includes permanently or semi-permanently attaching the sheet to the structure at a first portion of an area of the sheet. In block 715, the rupturable component is positioned through the one or more openings, such that one or more portions of the sheet near the one or more openings are protected by the sheet if an edge of the structure opening becomes frayed. Block 720, the sheet prevents damage to the rupturable component in the event of a fracture of the structure at or about the structure opening by that frayed edge.

One skilled in the art will recognize that sheet 600 and method 700 enhance aircraft safety and survivability in aircraft such as aircraft 100, 300, and 400 by protecting fuel lines and the like from jagged edges or debris created when composite materials fracture during, e.g., an impact.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. A method for protecting a rupturable component of a rotorcraft adjacent to a composite structural component of the rotorcraft, the structural component having one or more structure openings, comprising:
    positioning a sheet of material comprising one or more sheet openings at the one or more structure openings, wherein each of the one or more sheet openings comprise one or more slits in the sheet, and wherein the one or more sheet openings and the one or more structure openings accommodate the rupturable component;
    permanently or semi-permanently attaching the sheet to the structural component at a first portion of an area of the sheet; and
    positioning the rupturable component through the one or more sheet openings and the one or more structure openings, such that one or more portions of the sheet are deflected into the one or more structure openings, and such that one or more portions of the rupturable component near the one or more sheet openings and the one or more structure openings are protected by the sheet from jagged or frayed edges or flying fragments of the structural component if the structural component fractures at the one or more structure openings.

2. The method of claim 1, wherein the rupturable component is a fuel cell interconnect, a drain line, a hydraulic line, a soft interconnect, or a feed line.

3. The method of claim 1, wherein the sheet comprises para-aramid, meta-aramid, nylon, polyethylene, polyethylene terephthalate, or fibers.

4. The method of claim 1, further comprising providing a grommet, wherein the grommet is configured to be placed in the one or more sheet openings and the one or more structure openings and to receive the rupturable component.

5. A rotorcraft comprising:
    a fuselage;
    one or more engines coupled to the fuselage;
    a composite structural component coupled to the fuselage;
    a rupturable component; and
    a sheet of material with one or more sheet openings to accommodate the rupturable component being placed through the sheet, wherein each of the one or more sheet openings comprises one or more slits in the sheet;
    wherein the sheet has a portion of an area capable of being permanently attached or semi-permanently attached to the structural component, the structural component having one or more structure openings capable of receiving the rupturable component, such that the one or more sheet openings and the one or more structure openings are aligned to accommodate the rupturable component being placed through the one or more sheet openings and the one or more structure openings, such that one or more portions of the sheet are deflected into the one or more structure openings, such that the sheet is capable of protecting the rupturable component from jagged or frayed edges or flying fragments of the structural component if the structural component fractures at the one or more structure openings.

6. The rotorcraft of claim 5, wherein the rupturable component is a fuel cell interconnect, a drain line, a hydraulic line, a soft interconnect, or a feed line.

7. The rotorcraft of claim 5, wherein the sheet comprises para-aramid, meta-aramid, nylon, polyethylene, polyethylene terephthalate, or fibers.

8. The rotorcraft of claim 5, wherein the one or more sheet openings and the one or more structure openings are adapted to receive a grommet, wherein the grommet is adapted to be placed in the one or more sheet openings and the one or more structure openings and to receive the rupturable component.

* * * * *